(12) United States Patent
Kitazawa

(10) Patent No.: US 12,522,127 B2
(45) Date of Patent: Jan. 13, 2026

(54) VEHICULAR LAMP

(71) Applicant: KOITO MANUFACTURING CO., LTD., Tokyo (JP)

(72) Inventor: Tatsuma Kitazawa, Shizuoka (JP)

(73) Assignee: KOITO MANUFACTURING CO., LTD., Shizuoka (JP)

( * ) Notice: Subject to any disclaimer, the term of this patent is extended or adjusted under 35 U.S.C. 154(b) by 13 days.

(21) Appl. No.: 18/693,732

(22) PCT Filed: Sep. 20, 2022

(86) PCT No.: PCT/JP2022/034951
§ 371 (c)(1),
(2) Date: Mar. 18, 2025

(87) PCT Pub. No.: WO2023/054054
PCT Pub. Date: Apr. 6, 2023

(65) Prior Publication Data
US 2025/0376104 A1    Dec. 11, 2025

(30) Foreign Application Priority Data
Oct. 1, 2021    (JP) ................................. 2021-162622

(51) Int. Cl.
*B60Q 1/08* (2006.01)
*B60Q 9/00* (2006.01)
*F21S 41/675* (2018.01)

(52) U.S. Cl.
CPC ............ *B60Q 1/085* (2013.01); *B60Q 9/008* (2013.01); *F21S 41/675* (2018.01); *B60Q 2300/40* (2013.01)

(58) Field of Classification Search
CPC ............................... B60Q 1/085; F21S 41/675
See application file for complete search history.

(56) References Cited

U.S. PATENT DOCUMENTS

| 10,540,896 B2 * | 1/2020 | Kitano ................... G05D 1/024 |
| 2018/0342046 A1 * | 11/2018 | Tomatsu ................. G01S 19/14 |

FOREIGN PATENT DOCUMENTS

| CN | 108629281 A | 10/2018 |
| CN | 112026645 A | 12/2020 |

(Continued)

OTHER PUBLICATIONS

EESR issued on Dec. 23, 2024 for the corresponding EP Patent Application No. 22875924.7.

(Continued)

*Primary Examiner* — Sean P Gramling
(74) *Attorney, Agent, or Firm* — Rankin, Hill & Clark LLP

(57) ABSTRACT

Provided is a vehicular lamp capable of notifying, when a subject vehicle approaches a corner with a blind spot, a pedestrian or other vehicles in the blind spot at the corner of the subject vehicle approaching the corner. In a vehicular lamp which includes an adaptive lamp unit (4L, 4R), an object detection signal acquirer (5, 14) that acquires an object detection signal around a vehicle, and an adaptive controller (6L, 6R) that adjusts an irradiation area and an irradiation light amount of the adaptive lamp unit (4L, 4R) based on the acquired object detection signal, the adaptive lamp unit (4L, 4R) is configured to irradiate a curve mirror (CM, CM1, CM2) detected around the vehicle with light based on an object detection signal of the curve mirror (CM, CM1, CM2).

6 Claims, 4 Drawing Sheets

(56) References Cited

FOREIGN PATENT DOCUMENTS

| | | | | |
|---|---|---|---|---|
| DE | 102016215115 A1 | 2/2018 | | |
| GB | 2610185 A | * 3/2023 | ........... | G06V 20/584 |
| JP | 2010052688 A | 3/2010 | | |
| JP | 2011-031807 A | 2/2011 | | |
| JP | 2012203829 A | 10/2012 | | |
| JP | 2013-082253 A | 5/2013 | | |
| JP | 2014209285 A | 11/2014 | | |
| JP | 2015121967 A | 7/2015 | | |
| JP | 2016-009609 A | 1/2016 | | |
| JP | 2017-130398 A | 7/2017 | | |
| JP | 6414539 B2 | 10/2018 | | |

OTHER PUBLICATIONS

International Search Report dated Oct. 18, 2022 filed in PCT/JP2022/034951.

* cited by examiner (a)

(b)

VEHICULAR LAMP

TECHNICAL FIELD

Provided is a vehicular lamp capable of notifying, when a subject vehicle enters a corner with a blind spot, a pedestrian or other vehicles in the blind spot at the corner of the entrance of the subject vehicle.

BACKGROUND ART

Patent Literature 1 disclose, in FIGS. 3 and 4, a vehicle headlight that scanning the front of a vehicle at high speed by a scanning mechanism while performing predetermined white light ON/OFF control and displays a white light distribution pattern having a predetermined shape.

Patent Literature 2 discloses, in to and FIG. 7(*a*) to 7(*c*), a vehicle spot lamp control device that detects a pedestrian in front of a subject vehicle by, e.g., a camera and irradiates the detected pedestrian with spot light having a varying irradiation width to notify a driver of the subject vehicle of the risk of the pedestrian approaching the subject vehicle.

CITATION LIST

Patent Literature

Patent Literature 1: JP-A-2017-130398
Patent Literature 2: JP-A-2013-82253

SUMMARY OF INVENTION

Problems to be Solved by Invention

Although the vehicle headlight of Patent Literature 1 illuminates the front of the subject vehicle with the headlight light distribution pattern, the headlight light distribution pattern does not notify a pedestrian or other vehicles present around the subject vehicle of a specific course change direction. In addition, the vehicle spot lamp control device of Patent Literature 2 cannot detect a pedestrian in a blind spot at a corner, such as a T-junction or an intersection with a blind spot, and cannot notify the driver of the pedestrian.

In this case, it is preferred that the pedestrian in the blind spot visually recognizes the subject vehicle shown on a curve mirror installed at the corner and visually recognizes that the subject vehicle is approaching and which one of left and right turn signal lamps on the subject vehicle blinks, thereby recognizing that the subject vehicle is coming toward the pedestrian and avoiding collision with the subject vehicle.

However, the light of the turn signal lamp of the subject vehicle reflected by the curve mirror has a small amount of light and is emitted from only one of the left and right sides of the vehicle, and even if the light is reflected by the mirror, a diffusion area is narrow. For these reasons, there is a possibility that it is not possible to sufficiently notify the pedestrian in the blind spot of the subject vehicle turning in a direction toward the pedestrian.

In view of the above-described problems, the present application provides a vehicular lamp capable of notifying, when a subject vehicle enters a corner with a blind spot, a pedestrian or other vehicles in the blind spot at the corner of the entrance of the subject vehicle.

Solution to Problems

A vehicular lamp includes an adaptive lamp unit, an object detection signal acquirer that acquires an object detection signal around a vehicle, and an adaptive controller that adjusts the irradiation area and irradiation light amount of the adaptive lamp unit based on the acquired object detection signal. The adaptive lamp unit is configured to irradiate a curve mirror detected around the vehicle with light based on an object detection signal of the curve mirror.

(Effect) When the subject vehicle enters a corner with a blind spot, the curve mirror detected around the vehicle by the object detection signal acquirer is irradiated with directional light from the adaptive lamp unit, whereby reflected light for notifying the entrance is emitted to a wider area of the blind spot.

The object detection signal acquirer is preferably a peripheral detection unit that images the periphery of the vehicle and detects the curve mirror.

(Effect) When the subject vehicle enters the corner with the blind spot, the curve mirror detected around the vehicle based on an imaging result of the peripheral detection unit is irradiated with directional light from the adaptive lamp unit, whereby the reflected light for notifying the entrance is emitted to a wider area of the blind spot.

The vehicular lamp is preferably an adaptive vehicle headlight, and the adaptive lamp unit is preferably an adaptive headlight unit, and has, at least at part thereof, an irradiation area for irradiating the curve mirror with light.

(Effect) By irradiating the detected curve mirror with directional light using at least the partial irradiation area of the adaptive headlight unit, it is possible to irradiate the blind spot of the corner with the reflected light for notifying the entrance from a farther location with a greater light amount.

Light from the adaptive lamp unit is preferably blinking light.

(Effect) By blinking the reflected light for notifying the entrance onto a road in the blind spot, the reflected light changes as compared to a case where the reflected light is continuously on.

The adaptive lamp unit is preferably provided on both left and right sides of the vehicle.

(Effect) By irradiating the curve mirror with the irradiation light for notifying the entrance onto the road in the blind spot from the adaptive lamp units on both left and right sides of the vehicle, the reflection angle of the reflected light becomes greater.

The object detection signal acquirer preferably acquires a detection signal of left and right curve mirrors present around the vehicle, and the adaptive lamp unit is preferably configured to irradiate the curve mirror in a direction in which the subject vehicle does not turn with continuous light and irradiate the curve mirror in a direction in which the subject vehicle turns with blinking light.

(Effect) The blinking light is emitted to the blind spot in the direction in which the subject vehicle turns via the curve mirror installed in the direction in which the subject vehicle turns, and the continuous light is emitted to the blind spot in the direction in which the subject vehicle does not turn via the curve mirror installed in the direction in which the subject vehicle does not turn.

Effects of Invention

According to the vehicular lamp, the adaptive vehicular lamp irradiates a wider area with light brighter than reflected light of a turn signal lamp to notify a pedestrian or drivers of other vehicles in a blind spot at a corner of the entrance of the subject vehicle, so that it is possible to notify the pedestrian or the drivers of the other vehicles in the wider area of the entrance of the subject vehicle from the blind spot. In addition, even if the turn signal lamp is not turned on, it is possible to notify, from a farther location with stronger light, that the subject vehicle is turning in the direction in which the pedestrian is present.

According to the vehicular lamp, by irradiating the pedestrian or the other drivers in the blind spot at the corner with the reflected light using at least part of the headlight light much brighter than that of the turn signal lamp, it is possible to cause, e.g., the pedestrian to quickly recognize the risk due to the approach of the subject vehicle.

According to the vehicular lamp, by using the blinking light as the reflected light for notifying the entrance onto the road in the blind spot, it becomes easier for the pedestrian or the other drivers in the blind spot at the corner to recognize the approach of the subject vehicle from the blind spot at the corner even in the daytime as in flashing action performed by the headlight when giving way to other vehicles.

According to the vehicular lamp, the reflection angle of the reflected light for notifying the entrance onto the road in the blind spot becomes larger, so that it becomes easier for the pedestrian or the drivers of the other vehicles in the wider area in the blind spot at the corner to recognize the approach of the subject vehicle.

According to the vehicular lamp, the pedestrian or the drivers of the other vehicles in the blind spot in the direction in which the subject vehicle turns can quickly recognize that the subject vehicle is approaching the pedestrian or the drivers from the blind spot. The pedestrian or the drivers of the other vehicles in the blind spot in the direction in which the subject vehicle does not turn can recognize that the subject vehicle is approaching the pedestrian or the drivers although the subject vehicle does not turn from the blind spot in the direction in which the pedestrian or the drivers are present, and therefore, the pedestrian or the drivers of the other vehicles can pay attention not to jump out to the road.

DESCRIPTION OF EMBODIMENTS

Hereinafter, an embodiment of a vehicular lamp according to the present invention will be described with reference to FIGS. 1 to 4. In each figure, each direction with respect to a vehicle will be described as (upper: lower: left: right: front: rear=Up: Lo: Le: Ri: Fr: Re).

Figure 1:
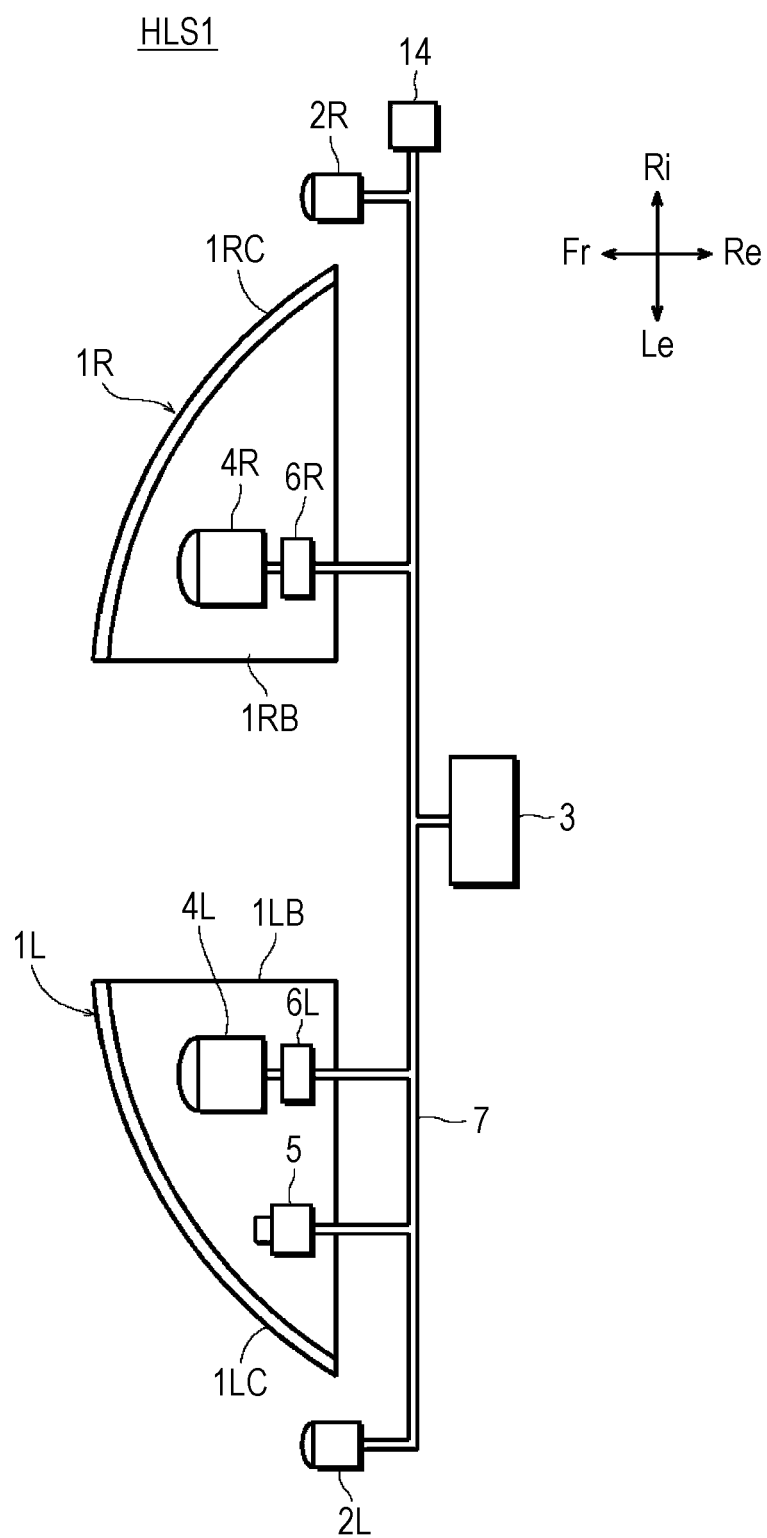
FIG. 1 is a schematic view of the configuration of a vehicle headlight system including an adaptive vehicle headlight which is a vehicular lamp of the present invention.
Figure 2:
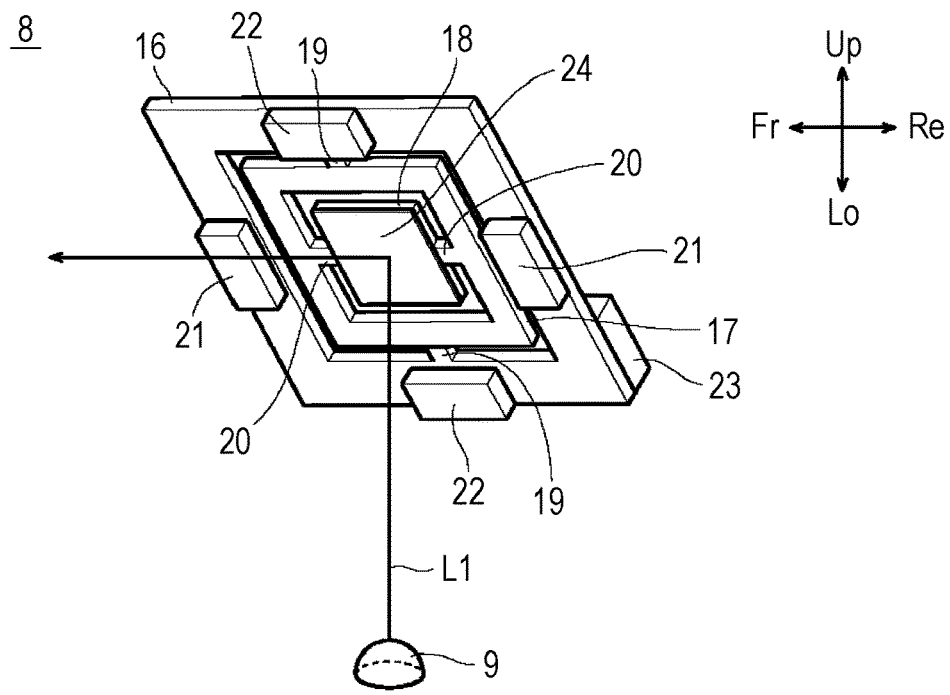
FIG. 2(a) is a perspective view of a scanning mechanism of an adaptive headlight unit of the vehicle headlight as viewed substantially from the front.
FIG. 2(b) is a horizontal sectional view of the adaptive headlight unit.
Figure 2:
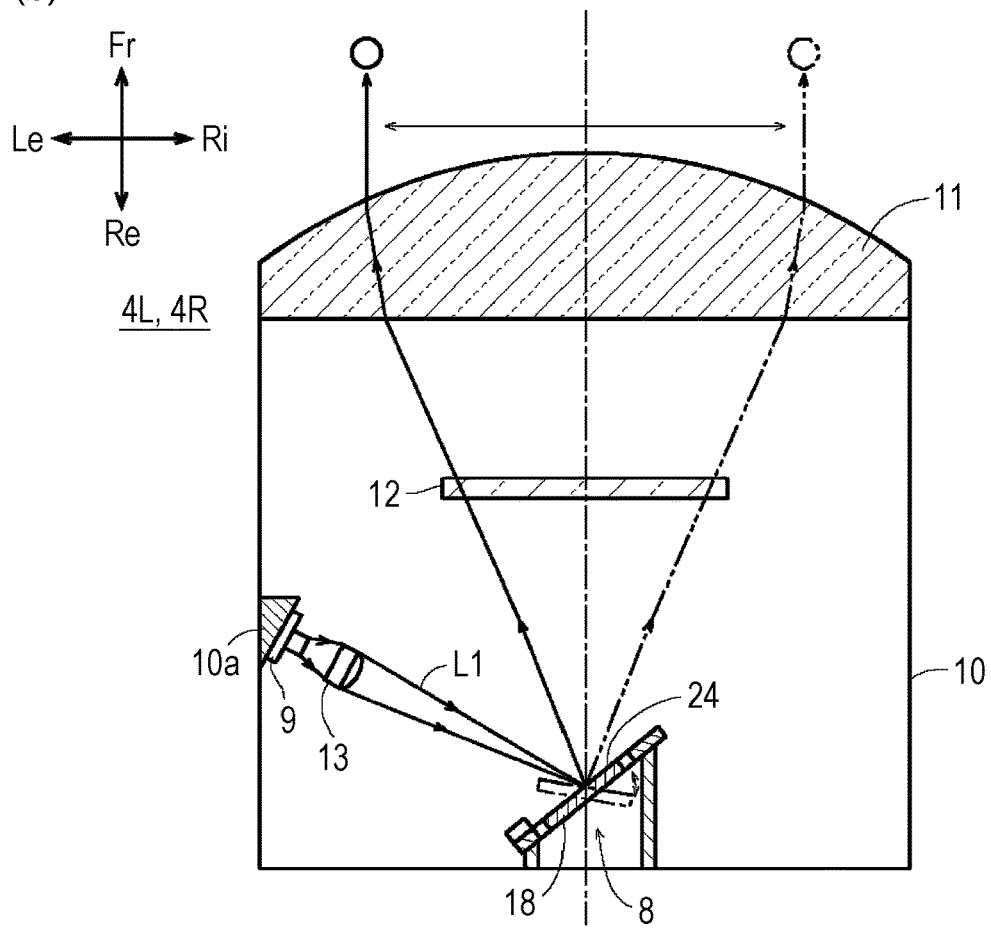
Figure 3:
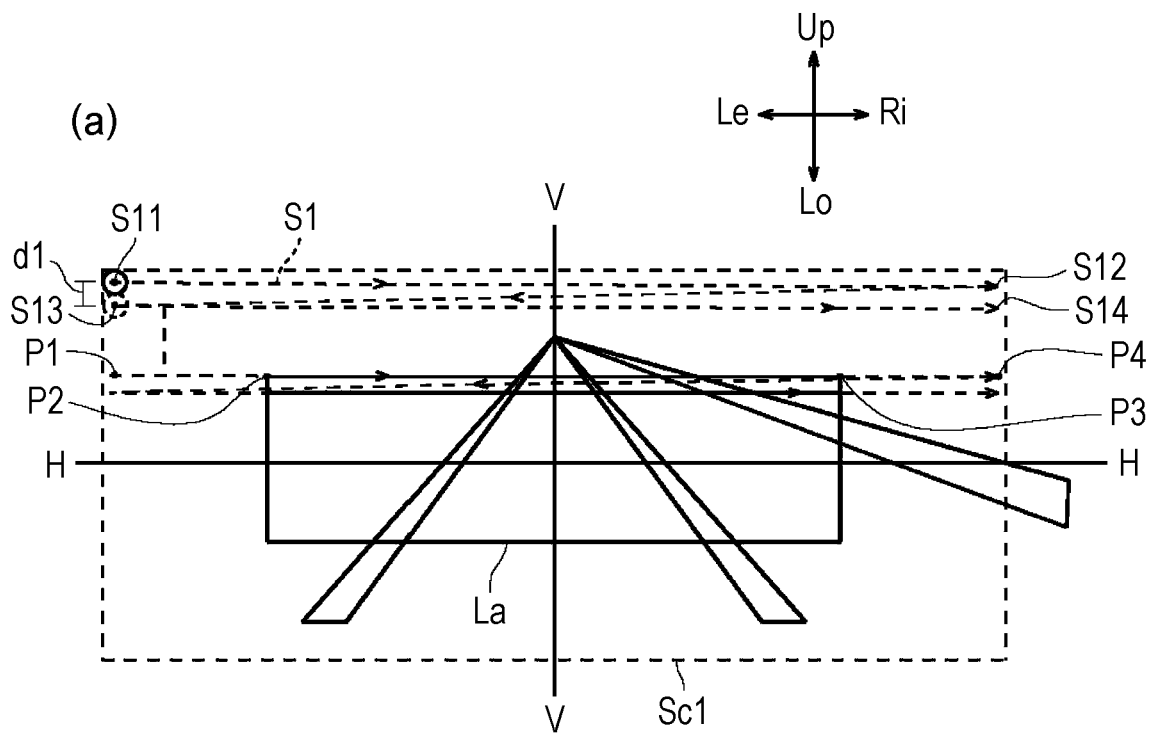
FIG. 3(a) is a view for describing a light distribution pattern forming technique by the scanning mechanism.
FIG. 3(b) is a view for describing a headlight light distribution pattern and curve mirror irradiation by the adaptive headlight unit.
Figure 3:
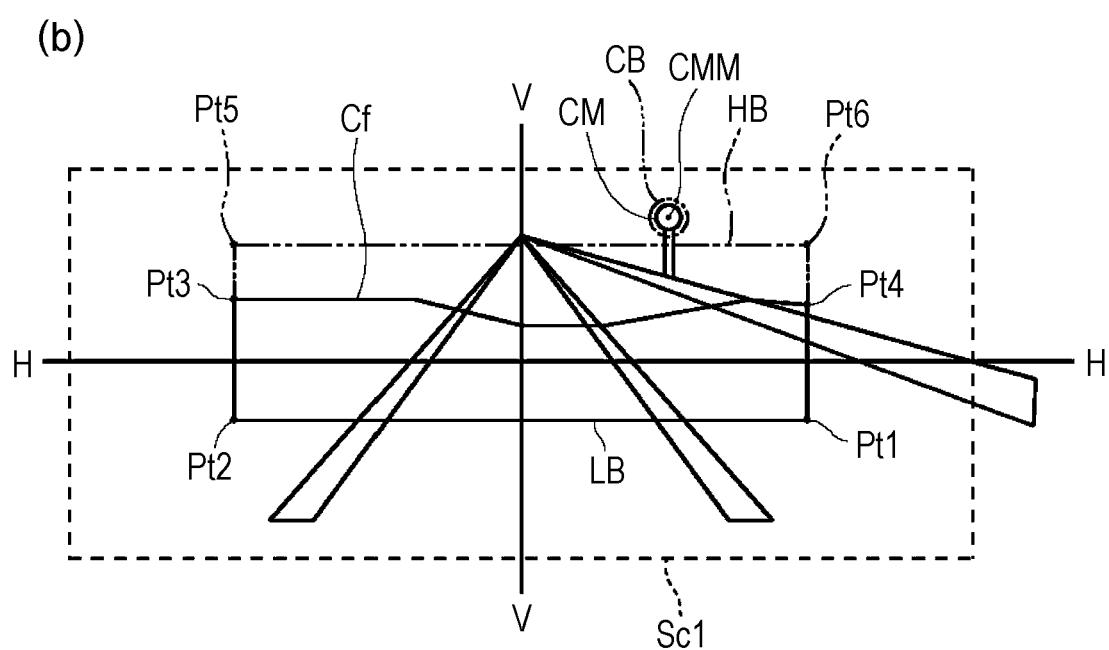
Figure 4:
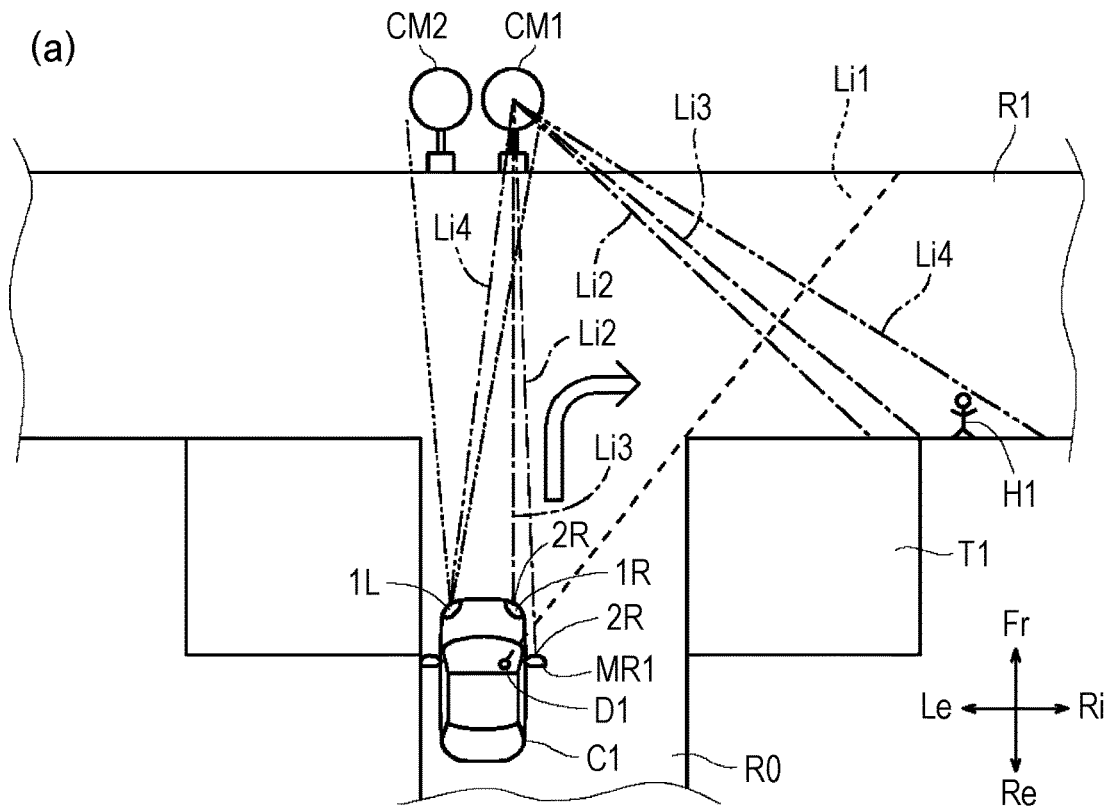
FIG. 4(a) is a view for describing a first example of the curve mirror irradiation.
FIG. 4(b) is a view for describing a second example of the curve mirror irradiation.
Figure 4:
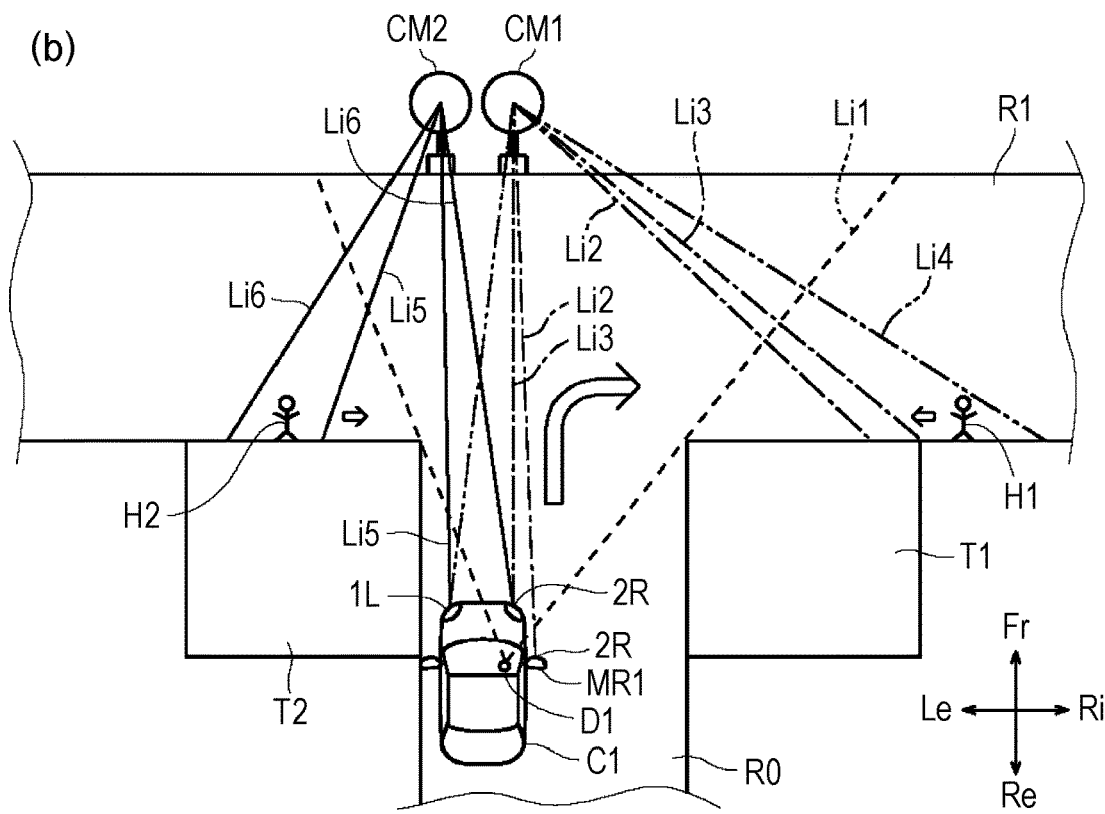

FIG. 1 shows a vehicle headlight system HLSI which includes a pair of left and right adaptive vehicle headlights (1L, 1R) as the vehicular lamp of the present invention, a pair of left and right turn signal lamps (2L, 2R), a vehicle CPU 3, and a communication unit 14 and is mounted on a subject vehicle C1 (see FIG. 4). The left vehicle headlight 1L includes, inside a lamp body 1LB and a front cover 1LC having translucency, a left adaptive headlight unit 4L, a left headlight CPU 6L, and an in-vehicle camera 5 as a peripheral detection unit. The right vehicle headlight 1R includes, inside a lamp body 1RB and a front cover 1RC having translucency, a right adaptive headlight unit 4R and a right headlight CPU 6R. The left adaptive headlight unit 4L has a configuration common to that of the right adaptive headlight unit 4R. Note that the in-vehicle camera 5 and the communication unit 14 form an object detection signal acquirer that detects a curve mirror around the vehicle. The in-vehicle camera 5 images the periphery of the front of a vehicle C1 and detects, e.g., the position and size of the curve mirror. The communication unit 14 receives, via inter-vehicle communication or network communication, a signal related to, e.g., the position and size of the curve mirror in front of the subject vehicle, which has been detected by a traffic infrastructure other than the subject vehicle, such as not-shown other vehicles present around the subject vehicle and a structure (traffic light, sign, building, etc.) on a road.

Note that the in-vehicle camera 5 may be installed in the right adaptive headlight unit 4R or may be installed at any location of a vehicle body of the subject vehicle C1 shown in FIG. 4 together with the communication unit 14 outside the lamp body (1LB, 1RB) and the front cover (1LC, 1RC), and only either one of the in-vehicle camera 5 and the communication unit 14 as the object detection signal acquirer may be mounted.

Operation of the turn signal lamps (2L, 2R), the in-vehicle camera 5, and the communication unit 14 is controlled by the vehicle CPU 3 connected via a signal cable 7. Each of the adaptive headlight units (4L, 4R) is connected to the vehicle CPU 3 via the headlight CPU (6L, 6R), and the headlight CPU (6L, 6R) controls ON/OFF of the adaptive headlight unit (4L, 4R) in a predetermined manner based on a control signal of the vehicle CPU 3. The vehicle CPU 3 analyzes imaging information obtained on the periphery of the subject vehicle by the in-vehicle camera 5, or detects, e.g., the position and size of the curve mirror present around the subject vehicle from an information signal related to the curve mirror, which has been received by the communication unit and turns on or off the adaptive headlight units (4L, 4R) in the predetermined manner based on a detection result.

FIG. 2(a) shows a scanning mechanism 8 provided in the adaptive headlight unit (4L, 4R). The scanning mechanism 8 is a scanning device having a reflecting mirror tiltable in two axial directions. The scanning mechanism 8 has a base 16 turnably supporting a first turning body 17 via a pair of first torsion bars 19, and a second turning body 18 turnably supported by the first turning body 17 via a pair of second torsion bars 20. The base 16 is provided with a pair of permanent magnets 21 and a pair of permanent magnets 22 in a direction in which the first and second torsion bars (19, 20) extend. First and second coils (not shown) energized via terminals 23 are each provided in the first and second turning bodies (17, 18), and are independently energized and controlled by the headlight CPU (6L, 6R) shown in FIG. 1.

The first turning body 17 shown in FIG. 2(a) reciprocates and tilts about the axis of the first torsion bar 19 based on ON or OFF of energization to the first coil (not shown), and the second turning body 18 reciprocates and tilts about the axis of the second torsion bar 20 based on ON or OFF of energization to the second coil (not shown). A reflection surface 24 tilts up, down, left, and right based on energization to the first or second coil (not shown), and reflects light from an LED light source 9 (which may be a laser light source). In this manner, scanning is performed up, down, left, and right. The light having passed through a phosphor 12 penetrates a projection lens 11 and the front cover (1LC, 1RC) shown in FIG. 1, and a white light distribution pattern having a predetermined shape based on scanning is displayed in front of the vehicle. Note that the adaptive headlight unit (4L, 4R) may include an LED array capable of displaying a light distribution pattern having a predetermined shape by turning on and off a large number of LEDs arrayed instead of the scanning mechanism 8.

FIG. 2(b) shows the configuration of the adaptive headlight unit (4L, 4R) shown in FIG. 1. Each of the adaptive headlight units (4L, 4R) includes the scanning mechanism 8, the LED light source 9, the projection lens 11, the phosphor 12, and a condenser lens 13 which is an optical system, all of which are attached to a support member 10. Light L1 emitted from the LED light source 9 fixed to a mount 10a enters the reflection surface 24 while being condensed by the condenser lens 13. The light L1 reflected by the reflection surface 24 penetrates the projection lens 11 and the front cover (1LC, 1RC) in FIG. 1, and a white light distribution pattern having a predetermined shape based on scanning is displayed in a predetermined direction at a predetermined position in front of the subject vehicle C1 shown in FIG. 45.

With reference to FIG. 3(a), a method of forming the light distribution pattern displayed in front of the vehicle by scanning performed by the adaptive headlight unit (4L, 4R) will be described. A reference numeral S1 indicates a trajectory of a scanning line by the scanning mechanism 8. In a rectangular scanning area (reference numeral Sc1) in front of the vehicle, the scanning mechanism 8 of FIG. 2(a) repeatedly performs the following at high speed: scanning from a left end S11 to a right end S12 by tilting of the reflection surface 24 shown in FIGS. 2(a) and 2(b), tilting the reflection surface 24 obliquely downward to the left toward a next left end S13 shifted downward by a minute distance d1 from the left end S11, and scanning again to a right end S14. The LED light source 9 is turned on and off under the control of the headlight CPU (6L, 6R). Specifically, the LED light source 9 is turned on in a section from P2 to P3, where a light distribution pattern La is displayed, to display a line image extending left and right, and is turned off in a section from P1 to P2 and a section from P3 to P4, where no light distribution pattern is displayed. The scanning mechanism 8 repeatedly performs, in the left-right direction at high speed, scanning with the light source turned on and off in the predetermined manner while shifting the scanning line downward by the minute distance d1, and stacks the line images vertically to display the white light distribution pattern La having the predetermined shape in front of the vehicle or irradiate a curve mirror reflection surface with directional light by means of scanning light.

Note that in the present embodiment, the vehicular lamp according to the present invention is the adaptive headlight and the adaptive lamp unit is the adaptive headlight unit, so that both the display of the light distribution pattern by the headlight and the directional irradiation of the detected curve mirror are performed by the adaptive headlight unit. However, the adaptive lamp unit for irradiating the curve mirror may be provided separately from the adaptive headlight unit for displaying the pattern by the headlight in the subject vehicle C1, thereby forming a vehicular lamp different from the vehicle headlight.

FIG. 3(b) shows various light distribution patterns displayed in front of the vehicle by the vehicle headlight (1L, 1R). A reference numeral LB indicates a low beam light distribution pattern which includes a cutoff line Cf and is displayed in an area surrounded by a solid line connecting reference numerals Pt1, Pt2, Pt3, Pt4. A reference numeral HB indicates a high beam light distribution pattern displayed in an area surrounded by a solid line and a two-dot chain line connecting reference numerals Pt1. Pt2, Pt5, Pt6. A reference numeral CB indicates a variable light distribution pattern formed by turning off the light source in an area surrounded by a three-dot chain line in a light-ON area of the high beam light distribution pattern HB.

In addition, the variable light distribution pattern CB surrounded by the three-dot chain line in FIG. 3(b) is a spot irradiation pattern detected outside the irradiation area of the high beam light distribution pattern HB and directionally emitted toward a reflection surface CMM of a curve mirror CM. The vehicle CPU 3 analyzes, e.g., the position of the curve mirror CM relative to the subject vehicle and the size of the reflection surface CMM of the curve mirror CM from an imaging result obtained by the in-vehicle camera 5 or an information signal related to the curve mirror CM, which has been received by the communication unit 14. The vehicle CPU 3 causes the adaptive headlight units (4L, 4R) to directionally irradiate the reflection surface CMM of the curve mirror CM whose position and size have been specified with light via the headlight CPUs (6L, 6R).

Next, first and second examples of irradiation of the curve mirror with light by the vehicle headlights (1L, 1R) of the present application will be described with reference to FIGS. 4(a) and 4(b). FIGS. 4(a) and 4(b) show the subject vehicle C1 which is about to turn right on a T-junction from a road R0 toward a road R1 intersecting the road R0. A right curve mirror CM1 and a left curve mirror CM2 are installed side by side on the intersecting road R1, and a pedestrian H1 approaching the subject vehicle is present on the right side of the intersecting road R1. The view of a driver DI of the subject vehicle C1 is blocked by a building T1, and for this reason, the driver DI cannot directly visually recognize the right side of a broken line Li1 on the intersecting road R1 and the pedestrian H1 in the blind spot of the driver DI also cannot directly visually recognize the approaching subject vehicle C1 due to the building T1.

In this case, when the right turn signal lamp 2R (one turn signal lamp is mounted on each of the right vehicle headlight 1R and a right door mirror MR1, and the same applies to a left vehicle headlight and a left door mirror) blinks at the time of the subject vehicle C1 shown in FIG. 4(a) turning right, light from the pair of right turn signal lamps 2R is not widely diffused even if reflected by the right curve mirror CM1 because the installation width of the pair of right turn signal lamps 2R in the left-right direction is short, and only an area surrounded by one-dot chain lines Li2, Li3 on the intersecting road R1 is irradiated with the light. Thus, when only the right turn signal lamp 2R blinks at the time of the vehicle turning right as in the related art, the pedestrian H1 cannot recognize the approaching subject vehicle C1 until reaching the area surrounded by the one-dot chain lines Li2, Li3 by walking.

In the first example, as shown in FIG. 4(a), when the subject vehicle C1 turns right, the vehicle CPU 3 causes both the left and right adaptive headlights (1L, 1R) to directionally irradiate the inside of the area of the reflection surface of the right curve mirror CM1 based on the detection result of the curve mirrors (CM1, CM2) obtained via the in-vehicle camera 5 or the communication unit 14. Since the left and right adaptive headlights (1L, 1R) have a wider installation width in the left-right direction than that of the pair of right turn signal lamps 2R, the right curve mirror CM1 diffuses and reflects the light wider than the pair of turn signal lamps, and the area surrounded by the one-dot chain line Li3 and the two-dot chain line Li4 is irradiated with the light. As a result, using part of the light from the left and right adaptive headlights (1L, 1R), the light with which the area surrounded by the one-dot chain line Li3 and the two-dot chain line Li4 is irradiated has a stronger light intensity than that of the turn signal lamp, and as shown in FIG. 4(a), the light is emitted, via the right curve mirror CM1, wider and farther than the light from the pair of turn signal lamps 2R, so that the pedestrian H1 can be quickly irradiated with the light and can quickly recognize the presence of the subject vehicle C1 approaching on the road R0 from the blind spot.

Note that the light directionally emitted from both the left and right adaptive headlights (1L, 1R) toward the right curve mirror CM1 may be continuous light, but is more preferably blinking light as with the right turn signal lamp. By using the blinking light changing similarly to that from the turn signal lamp, the pedestrian H1 can easily recognize that the white light is not a simple indication from the headlights but a walking instruction directed to the pedestrian H1. In addition, the light emitted from the left and right adaptive headlights (1L, 1R) to the right curve mirror may be directed from any one of the left and right adaptive headlights, but is more preferably emitted from both the left and right headlights in consideration of expanding the diffusion area.

As the light directionally emitted toward the right curve mirror CM1 detected at the time of the vehicle turning right, the blinking light is preferably emitted even during traveling in the daytime in which display by the headlight is not performed. By irradiating the curve mirror with blinking light such as flashing light even in the daytime, the pedestrian H1 easily recognizes that the subject vehicle C1 will turn right toward the pedestrian H1. In addition, the light directionally emitted toward the right curve mirror CM1 detected at the time of the vehicle turning right in the daytime is more preferably emitted in advance before light emission from the right turn signal lamp 2R. By quickly and directionally irradiating the curve mirror with part of the headlight light having a higher light intensity than that of the turn signal lamp, it is possible to notify the pedestrian H1 of the right turn faster than by turning on the turn signal lamp.

Note that when the subject vehicle C1 turns left, the left turn signal lamp 2L is turned on, and directional light emission similar to that performed for the right curve mirror CM1 when the vehicle turns right is performed for the left curve mirror CM2 by the left and right adaptive headlights (1L, 1R). In this manner, a pedestrian approaching the subject vehicle C1 from the left side of the intersecting road R1 is notified of the left turn.

Next, the second example of irradiation of the curve mirror with the light by the vehicle headlights of the present application will be described with reference to FIG. 4(b). In the first example of FIG. 4(a), only the detected right curve mirror CM1 is irradiated with the light from the left and right adaptive headlights (1L, 1R) when the vehicle turns right, and only the detected left curve mirror CM2 is irradiated with the light when the vehicle turns left. In the second example, both the left and right curve mirrors (CM1, CM2) are irradiated with the light from the adaptive headlights (1L, 1R). In either case of the right turn or the left turn, a pedestrian may approach from a blind spot in a direction in which the subject vehicle C1 does not turn. FIG. 4(b) shows a case where a pedestrian H2 approaches from the left side of the intersecting road R1 when the subject vehicle C1 turns right. In the case of the vehicle turning right as in the second example, when the right curve mirror CM1 is directionally irradiated with the light from the adaptive headlights (1L, 1R) and the left curve mirror CM2 is also simultaneously directionally irradiated with the light, the pedestrian H2 can quickly see the reflected light emitted to an area surrounded by solid lines Li5, Li6, and can recognize the presence of the subject vehicle C1 approaching the intersection of the T-junction from the blind spot of a building T2. This stops the pedestrian H2 from jumping out to the road R0.

Note that in the second example, it is preferred that when the subject vehicle C1 turns right, the light directionally emitted from the adaptive headlights (1L, 1R) to the right curve mirror CM1 is blinking light and the light directionally emitted from the adaptive headlights (1L, 1R) to the left curve mirror CM2 is continuous light. It is preferred that when the subject vehicle C1 turns left, the light directionally emitted from the adaptive headlights (1L, 1R) to the left curve mirror CM2 is blinking light and the light directionally emitted from the adaptive headlights (1L, 1R) to the right curve mirror CM1 is continuous light. For example, in the case of the right turn, by setting the light emitted via the right curve mirror CM1 as the blinking light, the pedestrian H1 approaching the subject vehicle C1 from the right side recognizes the blinking light as a direction indication, and easily recognizes that the approaching subject vehicle C1 will turn right. In addition, the pedestrian H2 approaching the subject vehicle C1 from the left side recognizes that the light emitted to the pedestrian H2 is not a blinking indication of the left turn but continuous light indicating only the approach, so that the pedestrian H2 can move ahead to the right on the intersecting road R1 without worrying about the left turn of the subject vehicle C1.

Note that when the subject vehicle C1 shown in FIGS. 4(a) and 4(b) is traveling at night and it is detected that the reflection surface CMM of the curve mirror CM is located within the irradiation area of the headlight light distribution pattern, it is preferred, as display by the headlights, that directional light irradiation from the adaptive headlights (1L, 1R) to any one (first example) or both (second example) of the left and right curve mirrors (CM1, CM2) is performed such that only the detection area of the reflection surface of the curve mirror (for example, when the vehicle turns right, the right curve mirror CM1) directed in a direction in which the subject vehicle C1 turns is irradiated with blinking light and other areas are irradiated with continuous light. This is because blinking of the entire headlight light distribution pattern either at the time of the right turn or the left turn by the adaptive headlights (1L, 1R) has a problem in that the visibility of the front of the subject vehicle driver DI is degraded. The direction indication by the adaptive headlights (1L, 1R) is preferably provided by irradiating only an area where the reflection surface of the curve mirror installed in the direction in which the vehicle turns is present with blinking light.

The present international application claims priority based on Japanese Patent Application No. 2021-162622 filed on Oct. 1, 2021, and the entire contents of Japanese Patent Application No. 2021-162622, which is the Japanese patent application of the present international application, are incorporated herein by reference.

The above description of the specific embodiments of the present invention has been presented for the purpose of illustration. The embodiments are not intended to be exhaustive or to limit the invention as it is in the form described. It is obvious to those skilled in the art that many modifications and alterations are possible in light of the contents of the description above.

LIST OF REFERENCE SIGNS 1L, 1R Vehicle Headlight (Vehicular Lamp)
4L, 4R Adaptive Headlight Unit (Adaptive Lamp Unit)
5 In-Vehicle Camera (Peripheral Detection Unit)
6L, 6R Headlight CPU (Adaptive Controller)
14 Communication Unit (Object Detection Signal Acquirer)
CM, CM1, CM2 Curve Mirror

The invention claimed is:

1. A vehicular lamp comprising: an adaptive lamp unit; an object detection signal acquirer that acquires an object detection signal around a vehicle; and an adaptive controller that adjusts an irradiation area and an irradiation light amount of the adaptive lamp unit based on the acquired object detection signal, wherein
the adaptive lamp unit is configured to irradiate a curve mirror detected around the vehicle with light based on an object detection signal of the curve mirror.

2. The vehicular lamp according to claim 1, wherein the object detection signal acquirer is a peripheral detection unit that images a periphery of the vehicle and detects the curve mirror.

3. The vehicular lamp according to claim 1, wherein
the vehicular lamp is an adaptive vehicle headlight, and
the adaptive lamp unit is an adaptive headlight unit, and at least at part thereof, has an irradiation area for irradiating the curve mirror with light.

4. The vehicular lamp according to claim 1, wherein light from the adaptive lamp unit is blinking light.

5. The vehicular lamp according to claim 1, wherein the adaptive lamp unit includes adaptive lamp units provided on both left and right sides of the vehicle.

6. The vehicular lamp according to claim 1, wherein
the object detection signal acquirer acquires a detection signal of left and right curve mirrors present around the vehicle, and
the adaptive lamp unit is configured to irradiate the curve mirror in a direction in which a subject vehicle does not turn with continuous light and irradiate the curve mirror in a direction in which the subject vehicle turns with blinking light.

* * * * *